_United States Patent Office_

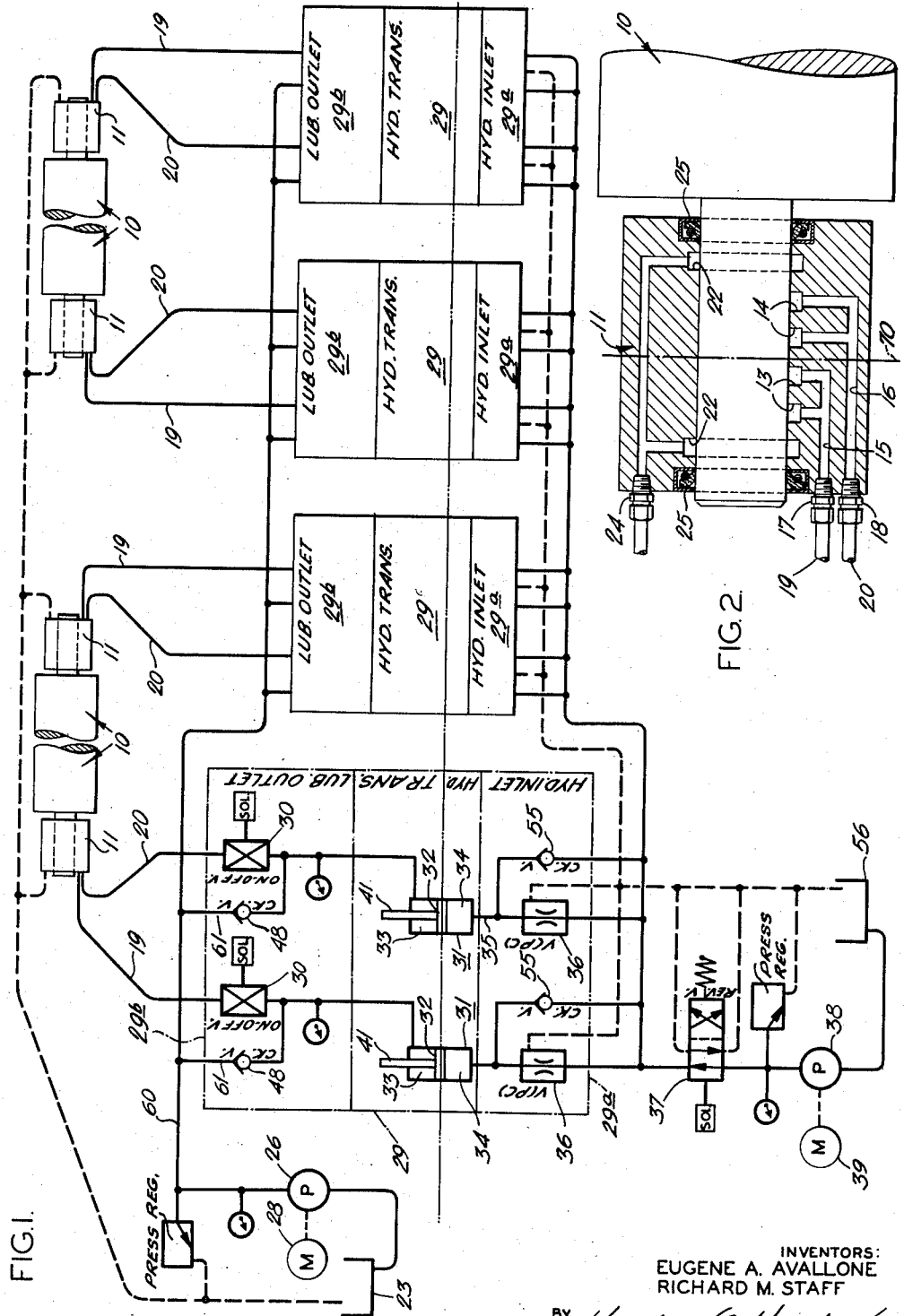

3,076,524
Patented Feb. 5, 1963

3,076,524
BEARINGS
Eugene A. Avallone, Chauncey, and Richard M. Staff, Yonkers, N.Y., assignors to Eastern Rolling Mills, Inc., New York, N.Y., a corporation of New York
Filed Feb. 8, 1960, Ser. No. 7,444
3 Claims. (Cl. 184—7)

The present invention relates to bearings, especially to improved controls for the lubricant supply to hydrostatic bearings in which a pressurized lubricant supplied from an external source is caused to flow through the bearings to provide a fluid film separating the moving parts of the bearing and supporting the load thereof.

A primary object of the present invention is to provide a control system for hydrostatic bearings providing a uniform support throughout the bearing for a member supported by the pressurized lubricant whereby misalignment due to eccentric or off-center loading of the member supported in the bearing is precluded.

The present invention is an improvement on the control for hydrostatic bearings disclosed in a co-pending application entitled, "Bearings," filed by Dudley Fuller et al. on September 8, 1959, S.N. 838,466, and assigned to the assignee of the present application. The control system of the present invention contemplates controlling the fluid supply to an elongated bearing so that a uniform supporting film is maintained throughout the length of the bearing whereby the member supported in the bearing is positioned coaxially of the bearing at all times. In this manner, when for example the bearing is used to support a shaft at its outer ends and the shaft is subjected to an off-center load, the shaft is precluded from contacting the bearings directly due to the uniform supporting films provided in the bearings by the control system of the present invention.

All of the objects of the invention and the various features and details of the construction and operation thereof are more fully set forth hereinafter with reference to the accompanying drawing wherein:

FIG. 1 is a schematic diagram of the hydraulic circuit for the control system of the present invention; and FIG. 2 is an enlarged view partially in section showing the construction of the bearing.

Referring more specifically to the drawings and particularly FIG. 1 thereof, reference numeral 10 designates a roll rotatably mounted at its outer ends in hydrostatic bearings 11. A pair of rolls are shown which may form the elements of a roll stand.

In accordance with the present invention means is provided to continuously supply lubricant to the bearings so that each cylindrical member or journal of the rolls is supported coaxially of the bearing at all times. To this end each bearing 11 is provided with a plurality of high pressure recesses into which lubricant is continuously supplied from a plurality of supply lines. As illustrated in FIG. 2, each bearing is provided with outer and inner high pressure recesses 13 and 14 respectively which through channels 15 and 16 and fittings 17 and 18 connect the recesses with supply lines 19 and 20. The lubricant supplied through the fittings is caused to flow out through the bearing into a pair of drain grooves 22 which collect the lubricant and return it to a reservoir shown diagrammatically at 23 through a fitting 24. The bearing is a complete bearing and is sealed as indicated at 25 so that the entire flow of the lubricant is into the reservoir 23. From the reservoir 23, the lubricant is returned to the system as set forth more fully hereinafter by means of a lubricant feed pump 26 driven by an electric motor 28.

Means are provided to supply fluid through the supply lines at a uniform predetermined rate. Since the system for supplying the outer and inner lines 19 and 20 respectively is the same, the elements comprising the system are described and designated hereinafter with similar reference numerals. With reference to the outer supply line 19, lubricant is fed to the high pressure recesses 13 through line 19 which is connected to a hydraulic transformer 29 having a hydraulic inlet 29a and a lubricant outlet 29b including a solenoid valve 30. In the present instance, the hydraulic transformer 29 comprises a cylinder 31 having a piston 32 therein, forming at one end a chamber 33 for the lubricant, and at the other end a chamber 34 for the control hydraulic fluid. The chambers are constructed so that expansion of one chamber effects a corresponding collapse or contraction of the other. The hydraulic fluid is supplied to the chamber 34 through the hydraulic inlet 29a including a line 35 having a flow control valve 36, in the present instance, a pressure-compensated valve operable to provide constant flow, and a check valve 55. The inlet 29a is connected to a solenoid valve 37, and a pump 38 driven by an electric motor 39. The valve 36 effects a controlled constant flow of hydraulic fluid into the chamber 34 to cause the piston 32 to elevate and discharge lubricants through the line 19 into the recess 13 of the bearing. Since the hydraulic fluid may be of low viscosity relative to the highly viscous lubricant, control of the hydraulic fluid by the valve 36 is relatively simple and economical. Because of differential effect of the piston rod 41 within the chamber 33, the transformer 29 steps up the pressure transferred from the hydraulic side to the lubricant side of the transformer 29. Thus the hydraulic transformer insures effective operation of the hydrostatic bearing 11.

Means is provided to charge the lubricant chambers 33 of the several hydraulic transformers 29 when the supply of lubricant therein is depleted. To this end when the supply of lubricant in the chamber is low, which may be indicated for example by an indicator which gives an audible or visible signal at a predetermined liquid level, the solenoid valves 30 are closed, the solenoid valve 37 is opened and the motor 28 is started to actuate the pump 26 for pumping lubricant from the reservoir 23 into the lines 60 and 61 and through check valves 48. Flow of the lubricant into the several chambers 33 drives the pistons 32 downwardly and discharges the hydraulic fluid from the chambers 34 through a check valve 55 bypassing the flow control valve 36 and into a sump 56 by way of the solenoid valve 37.

When the piston 32 reaches a predetermined lower limit position, the motor 28 driving pump 26 is shut off. Valve 30 is then actuated to the open position and the valve 37 is actuated to the illustrated position to render the system operative to provide the necessary flow of lubricant through the bearings 11. A suitable electric circuit is provided to actuate the motors 28 and 39 and the solenoid valves 30 and 37.

It is understood that the recharge system also may be effectively operated by manually-operated valves instead of the solenoid valves 30 and 37. On the other hand, a circuit may be provided to automatically re-charge the system when the lubricant supply becomes depleted.

In the operation of the system of the present invention, a continuous uniform flow of lubricant is supplied to the recesses 13 and 14 at opposite sides of the transverse center plane 70 of the elongated bearing through the supply lines 19 and 20 respectively. This provides a continuous film of lubricant throughout the length of the bearing. Accordingly a tendency of the member supported in the bearing to tilt or cant, when for example an off-center load is applied thereto, is overcome since the uniform fluid flow at opposite ends of the elongated bearing provides a continuous film throughout the length of the bearing. Since the system is not affected by pressure changes in the supply lines which may result from load changes in the member supported, it is apparent that the roll 10 is maintained coaxially of the bearing at all times. Spacing of recesses adjacent opposite ends of an elongated bearing and providing separate supply lines for the recesses with flow control means therein to assure uniform flow are features of the present invention which provide the improved bearing support.

While the invention has been described with particular reference to a hydraulic cylinder type of transformer it is apparent that other hydraulic transformers may be substituted for those illustrated in the drawing. Likewise, a pressure-compensated flow control valve providing a constant flow has been illustrated and described, but other flow control components may be employed without departure from the present invention. Other modifications may be made within the scope of the invention as defined by the appended claims.

What is claimed is:

1. A lubricant supply system for an elongated hydrostatic bearing for a cylindrical journal member rotatable therein, comprising in combination, means defining separate and independent lubricant recesses in the bearing confronting the surface of said journal member at opposite sides of a transverse central plane of the bearing, separate and independent conduits connected respectively with said recesses providing for the supply of lubricant to said recesses, separate and independent supply lines connected respectively with said conduits, separate and independent lubricant supply means for continuously supplying lubricant to each of said supply lines, each of said lubricant supply means including flow control means for separately and independently controlling the flow of lubricant to its respective supply line, and means for continuously collecting lubricant flowing through said bearing, said lubricant flow control means including a lubricant supply chamber connected to each of said supply lines, and means for forcing lubricant from said supply chamber to the line at a uniformly constant rate to thereby insure a constant predetermined flow of lubricant to the line for each end of the bearing.

2. A lubricant supply system for an elongated hydrostatic bearing for a cylindrical journal member rotatable therein, comprising in combination, means defining separate and independent lubricant recesses in the bearing confronting the surface of said journal member at opposite sides of a transverse central plane of the bearing, separate and independent conduits connected respectively with said recesses providing for the supply of lubricant to said recesses, separate and independent supply lines connected respectively with said conduits, separate and independent lubricant supply means for continuously supplying lubricant to each of said supply lines, each of said lubricant supply means including flow control means for separately and independently controlling the flow of lubricant to its respective supply line, and means for continuously collecting lubricant flowing through said bearing, said lubricant flow control means including a collapsible lubricant supply chamber connected to each of the lubricant supply lines to supply high-viscosity lubricant thereto, an expandible hydraulic fluid chamber adjacent each of said lubricant supply chambers and having associated means operatively connected thereto to collapse said lubricant supply chamber upon expansion of said hydraulic fluid chamber, means to supply low-viscosity hydraulic fluid to said expandible hydraulic fluid chamber to expand the same, and flow control means between said hydraulic fluid supply means and said expandible hydraulic chamber to control the rate of flow of hydraulic fluid to said hydraulic fluid chamber and thereby control the rate of collapse of said lubricant supply chamber and consequently the rate of flow of lubricant to the line for each end of said bearing.

3. A lubricant supply system for an elongated hydrostatic bearing for a cylindrical journal member rotatable therein, comprising in combination, means defining separate and independent lubricant recesses in the bearing confronting the surface of said journal member at opposite sides of a transverse central plane of the bearing, separate and independent conduits connected respectively with said recesses providing for the supply of lubricant to said recesses, separate and independent supply lines connected respectively with said conduits, separate and independent lubricant supply means for continuously supplying lubricant to each of said supply lines, each of said lubricant supply means including flow control means for separately and independently controlling the flow of lubricant to its respective supply line, and means for continuously collecting lubricant flowing through said bearing, said means for collecting the lubricant from said bearing including collecting recesses in said bearing outboard of said lubricant recesses providing for outboard flow of lubricant on each side of the transverse central plane from a lubricant supply recess to a lubricant collecting recess, said bearing also including sealing means located at each end outboard of said collecting recess.

References Cited in the file of this patent

UNITED STATES PATENTS

| 2,038,287 | Hawks et al. | Apr. 21, 1936 |
| 2,578,711 | Martellotti | Dec. 18, 1951 |
| 2,937,294 | Macks | May 17, 1960 |
| 2,938,756 | Loeb | May 31, 1960 |